(12) United States Patent
Keinath

(10) Patent No.: US 9,079,356 B2
(45) Date of Patent: Jul. 14, 2015

(54) METHOD AND APPARATUS FOR PRODUCING A THREE-DIMENSIONAL OBJECT

(76) Inventor: Renate Keinath, Balingen (DE)

(*) Notice: Subject to any disclaimer, the term of this patent is extended or adjusted under 35 U.S.C. 154(b) by 141 days.

(21) Appl. No.: 13/820,653

(22) PCT Filed: Aug. 31, 2011

(86) PCT No.: PCT/EP2011/004380
§ 371 (c)(1),
(2), (4) Date: Mar. 4, 2013

(87) PCT Pub. No.: WO2012/028308
PCT Pub. Date: Mar. 8, 2012

(65) Prior Publication Data
US 2013/0156952 A1 Jun. 20, 2013

(30) Foreign Application Priority Data
Sep. 2, 2010 (DE) .......................... 10 2010 044 268

(51) Int. Cl.
*B29C 67/00* (2006.01)
(52) U.S. Cl.
CPC .................................. *B29C 67/0059* (2013.01)
(58) Field of Classification Search
USPC .................... 427/421.1, 424, 427.3
See application file for complete search history.

(56) References Cited

U.S. PATENT DOCUMENTS 5,136,515 A * 8/1992 Helinski ........................ 700/119

FOREIGN PATENT DOCUMENTS

| EP | 1886793 A1 | 2/2008 |
|---|---|---|
| WO | 9709125 A1 | 3/1997 |

OTHER PUBLICATIONS

International Search Report for corresponding application PCT/EP2011/004380 filed on Aug. 31, 2011; Mail date Feb. 3, 2012.

* cited by examiner

*Primary Examiner* — Nathan T Leong
(74) *Attorney, Agent, or Firm* — Cantor Colburn LLP

(57) ABSTRACT

In the case of a method and an apparatus, three-dimensional objects (16) can be produced from a solidifiable material by the sequential discharging of discontinuous drops (15). To this end, the solidifiable material is plasticized in the fluid phase and is introduced into a material store (12) having at least one discharging unit (13) which can be clocked. From there, the material is discharged in a dropwise manner by means of a discharging unit (13) in the direction of an object carrier (14) for an object (16), wherein the object carrier (14) and an outlet opening can be moved at a relative spacing in relation to one another in space in order to influence the drop shape. The creation of the drops is supported by changing the relative spacing in an alternating manner in opposite directions during the discharging of the drops from the discharging unit (13) and during the application of the drops to the three-dimensional object (16) during the production of the object.

4 Claims, 2 Drawing Sheets

METHOD AND APPARATUS FOR PRODUCING A THREE-DIMENSIONAL OBJECT

REFERENCE TO RELATED APPLICATIONS

The present application claims the priority from German patent application 10 2010 044 268.2, filed on 2 Sep. 2010, the disclosure content of which is hereby incorporated by reference in its entirety.

TECHNICAL FIELD

The invention relates to a method and an apparatus for producing a three-dimensional object from a solidifiable material according to the preamble of claims 1 and 6.

RELATED ART

In plastics parts manufacture, injection molding or extrusion are used to produce parts in large batch sizes and production runs. The advantage of plastics injection molding in particular resides in the highly accurate production of complex part geometries, the functional versatility of the injection molding method optimally satisfying the requirement for an inexpensive and economically viable production of plastics parts.

On the other hand, there is ever greater demand for plastics parts which are produced in very small numbers of units, or even only as single units, up to small batch sizes, such as for example samples which must be provided very rapidly and with properties which are similar to those of injection-molded parts. Manufacturing processes for producing such parts are known widely as "prototyping". Such parts are in most cases produced by generating a geometry on the basis of 3D data. These geometries are produced in a wide variety of forms using appropriate means such as fusing powder layers by inputting heat, for example by means of a laser, generative systems such as printing processes, the powder particles being bound in different ways, or indeed using "melt strand" methods.

EP 1 886 793 A1, on which the precharacterising clause of claim 1 is based, discloses an apparatus in which a plasticizing unit known in principle in injection molding technology is coupled to a pressurisable material storage means for the fluid phase of a material. In order to produce an object on an object carrier, said material is discharged via a discharge opening of a discharge unit in the form of discontinuous droplets. Due to the adhesive forces of the material, an elevated pressure and melting temperatures for the material are necessary for this purpose, especially since the droplets are intended to have a size of 0.01 to 0.5 mm$^3$. Said apparatus already comprises control means for the object carrier for movement in the x, y and also the z directions relative to the discharge unit. When setting up the apparatus, the spacing between the discharge unit and object carrier is selected such that the droplets can form a free flying droplet over their trajectory.

BRIEF SUMMARY OF THE INVENTION

On the basis of this prior art, the problem underlying the present invention is that of providing a method and an apparatus for producing a three-dimensional object using solidifiable materials which promote droplet generation.

Said problem is solved by a method having the features of claim 1 and by an apparatus having the features of claim 6.

It has been demonstrated in practice that only to a limited extent does the spacing between discharge unit and object carrier or the three-dimensional object to be created thereon affect the ability of a free flying droplet to form. While this is indeed helpful, droplet formation and also the shape of the resultant object may, however, be improved in that the relative spacing between object carrier or three-dimensional object, on the one hand, and outlet opening, on the other hand, is varied alternately in opposite directions on discharge of the droplets and on application of the droplets. For instance, to produce discontinuous droplets, droplet detachment may preferably be influenced in that, after impingement of the droplet on the object, detachment is accelerated by increasing the relative spacing. By an acceleration opposite to the direction of gravity, it is likewise preferably possible to influence the distribution of the droplet on the object such that cavities are better filled and the droplet is flattened. It is likewise advantageous if, prior to triggering of the next droplet, the discharge unit briefly comes into contact with the droplet in order, so to speak, to press down or geometrically stabilize the latter, so contributing to even application.

With suitable control means, the apparatus may thus be used so efficiently that, even with minuscule droplets, it is possible to produce a high-quality three-dimensional object, such as a prototype, from the 3D data. The stated interrelationships or spacings are to be taken into account in order to obtain the corresponding structures and geometries.

Further advantages are revealed by the subclaims and the following description.

BRIEF DESCRIPTION OF THE DRAWINGS

The invention is explained in greater detail below with reference to an exemplary embodiment illustrated in the Figures, in which.

DETAILED DESCRIPTION OF PREFERRED EMBODIMENTS

The invention will now be explained in greater detail by way of example with reference to the appended drawings. However, the exemplary embodiments are merely examples, and are not intended to restrict the inventive concept to a specific arrangement. Before the invention is described in detail, it should be pointed out that it is not limited to the particular components of the apparatus and the particular method steps, since these components and methods may vary. The terms used herein are merely intended to describe particular embodiments and are not used in a limiting manner. In addition, where the description or the claims uses the singular or indefinite article, this also covers a plurality of said elements, providing that the overall context does not unambiguously indicate otherwise.

Figure 1:
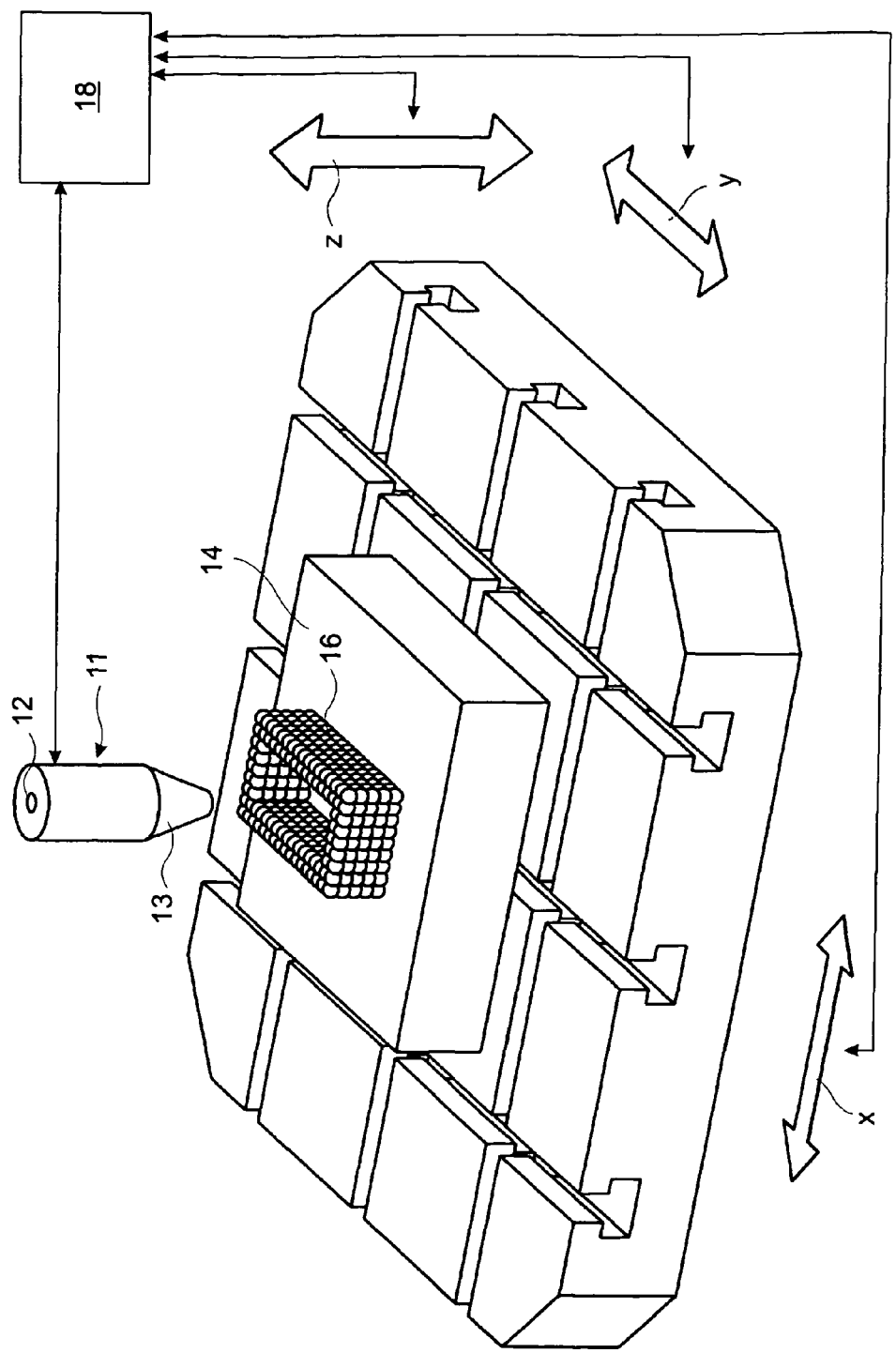
FIG. 1 is a schematic three-dimensional representation of object carrier and discharge unit.

FIG. 1 shows an apparatus for producing a three-dimensional object 16 from a solidifiable material which is either in the fluid phase from the outset or may be liquefied. The three-dimensional object is built up by sequential application of discontinuous droplets 15 from a cyclable discharge unit. The object 16 is created by the droplets 15 layer by layer on an object carrier 14. By using control means 18 with the assistance of associated actuators (not shown in the drawings), the object carrier 14 may be displaced in the x, y and z directions. The control means additionally drive the discharge unit 13. In this manner, it is inter alia also possible to influence the relative spacing s (FIGS. 2c, 2f) between the object carrier 14 or three-dimensional object 16, on the one hand, and the outlet opening 20 of the discharge unit 13, on the other hand, relative to one another in order to influence droplet shape. In other words, the object carrier 14 or object may be moved towards or away from the outlet opening and/or the outlet opening 20 may be moved towards or away from the object carrier, in order to vary the relative spacing.

The discharge unit 13 is part of a plasticizing unit 11 which is known per se in principle from injection molding technology, which plasticizing unit at the same time also comprises the pressurisable material storage means 12 for introducing the fluid phase into the material storage means. The pressure on the fluid phase in the material storage means 12 generates the discontinuous droplets 15 in directly coupled manner. This is described in greater detail in EP 1 886 793 A1.

The solidifiable material is a plasticized material, such as for example silicone, or a plastic sable material such as a plastics material or also pulverulent materials, the essential feature being that the solidifiable material is either in the fluid phase from the outset or may be liquefied. The material may also be a material which can be melted reversibly when exposed to heat and is thus recyclable. It is thus conceivable for the material to be converted into the fluid phase by melting and to resolidify after dispensing, or for it to be provided in the fluid phase and to require solidification after dispensing, for example by energy input, or for it to comprise volatile constituents, the volatilization of which brings about curing. Any other materials may be used, provided that said materials can be plasticized by the apparatus and above all can be discharged by the at least one discharge unit 13.

In the fluid phase, the solidifiable material exhibits a so-called frontal laminar flow. Frontal laminar flow inter alia involves the melt depositing itself on the wall. This becomes clearest from an examination of knowledge arising from injection molding technology. When filling a simple, rectangular mound channel, the melt is injected via a so-called gate and begins to propagate circularly from this point with continuous flow fronts until it fills the entire width of the cavity. Some time thereafter, the region between the inlet and flow front may be considered to be virtually formed. Particular flow conditions, the "frontal laminar flow", prevail at the flow front itself, as the flow lines in this region have the appearance of a source when observed relative to a system of coordinates which moves together with the front. The melt flows between two rapidly solidified layers of melt located close to the surfaces of the cavity, the melt progressing towards the flow front at higher velocities in the middle of the cavity. Shortly before the melt reaches the flow front, its velocity component in the direction of flow declines, and it flows obliquely to the wall until it lies against the wall.

On the one hand, due to its laminar nature, frontal laminar flow is advantageous for producing 'oriented' droplets 15 on the object carrier 14, while on the other hand precisely those problems which complicate implementation using devices and materials known from injection molding technology also arise here in particular with the formation of small droplets. Wall adhesion means that the melts may only be converted with difficulty into droplets with desired small volumes, preferably in the range of less than or equal to 1 mm³, and with desired flight velocity while on the other hand an appropriately high viscosity of the material is precisely of significance for the formation of a suitable droplet shape of a discontinuous droplet.

This also differentiates the materials used from the prior art waxes. Thanks to their viscosity, waxes may be dispensed using normal thermal printing or inkjet methods, i.e. by purely kinematic, pressure-less acceleration without a pressure difference of the molten droplet. The materials used here differ therefrom not least in that their viscosity number is higher by one or more powers of ten. The dynamic viscosity number of the solidifiable material is accordingly between 100 and 10000 [Pa·s], the solidifiable material preferably being a plastics material or resin which is conventional in injection molding technology. This makes it necessary to carry out processing from a pressurisable material storage means 12, since pressures of more than 10 to 100 MPa (100 to 1000 bar) are in any event necessary, in particular if small discharge openings 20 are used in order to achieve small droplet volumes.

The desired volume of the droplet 15 is preferably in particular in the range from 0.01 to 0.5 mm³, preferably in the range from 0.05 to 0.3 mm³ and particularly preferably in the range of around 0.1 mm³. The diameter of the discharge opening 20 is in particular less than or equal to 1 mm, preferably around 0.1 mm. At a wholly conventional injection velocity of 100 [cm/s], which delivers the melt through a so-called pin gate 0.1 [mm] in diameter, a value of 10,000 m/s is obtained for volume flow by area. This leads to a frontal laminar flow for the fluid phase with flow velocities of up to 10,000 m/s.

With its discharge unit 13, the apparatus has the task of discharging high-viscosity fluid materials, such as molten plastics materials, in minuscule quantities of down to a few micrograms from a material storage means 12 which is under elevated pressure and possibly a high melting temperature. The minuscule quantities/droplets 15 of the material are discharged in discrete individual portions, the size of which may be influenced by the apparatus. The discharged portions have such a high kinetic energy that they are capable of overcoming adhesive forces, detaching themselves from the apparatus and forming droplets 15 in order to build up the three-dimensional object 16 on the object carrier 14.

As these materials are liquid but of high-viscosity with high adhesive force and low weight, the kinetic energy is transferred by means of a pressure difference between the material storage means 12 and the "flight space" for the droplets 15. Portioning is effected by means of a cyclically operated aperture which is for example provided with a nozzle needle or the like as closure means. As a result of the required dimensions of the portions and also of the viscosity characteristics, pressures in the range from 100 MPa (1000 bar) and above, closure apertures of smaller than 0.1 mm and furthermore closure times of less than 0.001 s are normally necessary. Since the materials are mainly plastics materials, melt temperatures of up to 450° C. prevail in the material storage means.

The discontinuous droplets 15 must be able to form under these conditions while, on the other hand, relatively stringent quality requirements apply to the three-dimensional object 16 to be produced. Control means 18 therefore alternately influence as required in opposite directions the velocity and/or direction with which at least one of the elements comprising object carrier 14 or three-dimensional object 16, on the one hand, and outlet opening 20, on the other hand, are moved relative to one another with accompanying variation of the relative spacing s. Said influence is above all exerted on discharge of the droplets from the discharge unit 13 and on application of the droplets 15 onto the three-dimensional object 16.

FIGS. 2a to 2f show the associated method sequence. In order to apply the discontinuous droplets 15, the solidifiable material is plasticized in the plasticizing unit 11 and discharged in droplet form from the material storage means 12 therein with the cyclable discharge unit 13. According to FIG. 2a, the droplets 15 are discharged from the outlet opening 20 towards the object carrier 14. Some droplets, from which the outline of the object 16 may be recognized, are already present on the object carrier 14. The object carrier 14 or three-dimensional object 16, on the one hand, and the outlet opening 20, on the other hand, are movable in space relative to one another with accompanying variation of the relative spacing thereof in order to influence droplet shape. In comparison with FIG. 2a, in FIG. 2b the droplet 15 has already emerged from the discharge unit 13 and is now in contact with the object carrier 14 or the three-dimensional object 16 which has already been built up thereon. As may be seen, the droplet 15 is at this moment connected both to the discharge unit 13 and to the object carrier 14. The spacing between discharge unit and object carrier here roughly corresponds to the length l of the droplet on discharge.

Figure 2A:
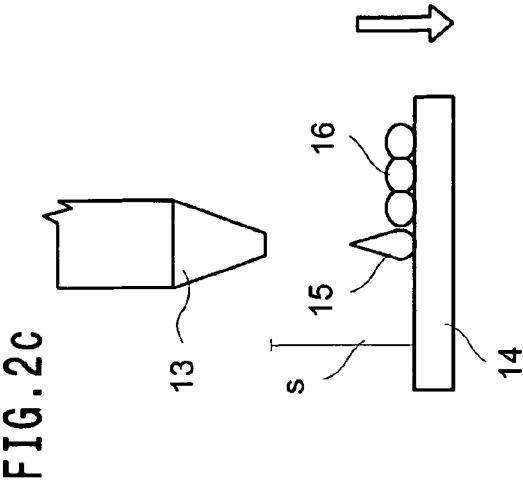
FIGS. 2a-2f show a schematic sequence during application of a droplet onto the object carrier.
Figure 2B:
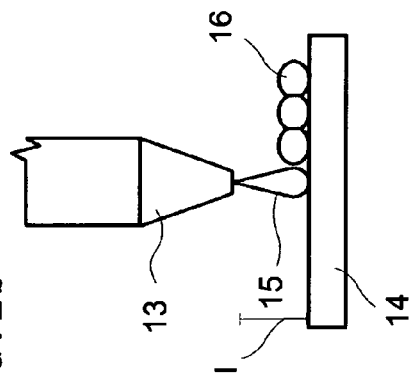
Figure 2C:
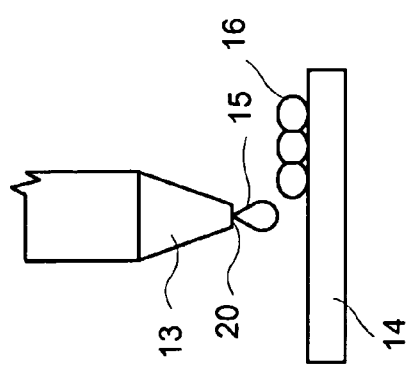

If, in the next step, the relative spacing s according to FIG. 2c is increased in this case by a vertical downwards movement of the object carrier 14 (alternatively, the discharge unit 13 could also be moved upwards), this promotes detachment of the droplet 15 from the discharge unit 13, which at the same times assists in allowing the next droplet to be discharged in a timely manner.

Figure 2D:
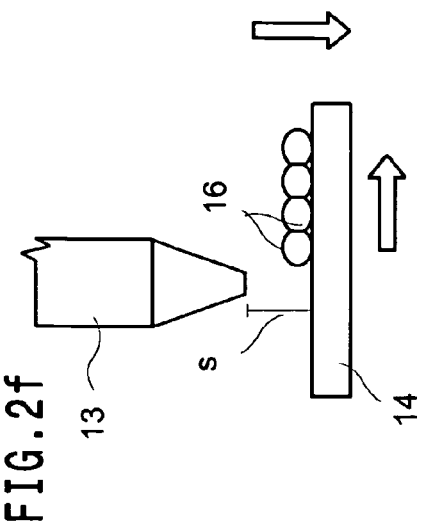

After detachment of the droplet 15, according to FIG. 2d the object carrier 14 is moved vertically upwards in the direction of the arrow opposite to the direction of gravity. This acceleration opposite to the direction of gravity promotes the distribution of the droplet 15 on the object carrier 14 or the three-dimensional object 16 such that cavities are better filled and the droplet 15 is flattened.

Figure 2E:
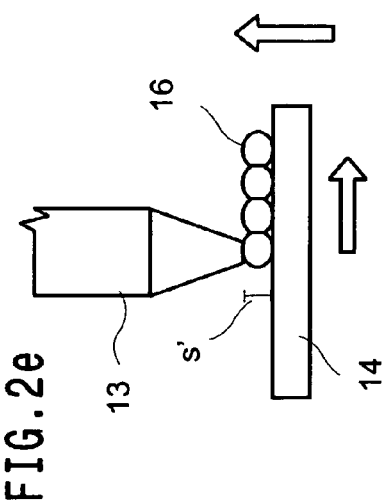
Figure 2F:
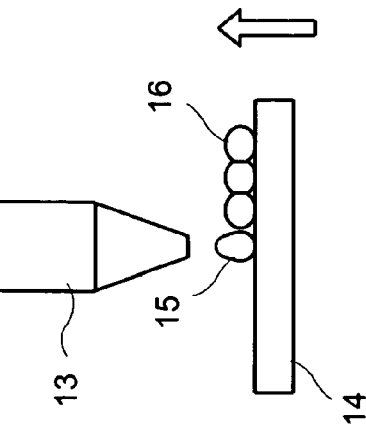

If that were not enough, in the next step according to FIG. 2e the relative spacing s is reduced to the relative spacing s', down to the height of application of a layer, i.e. reduced until the discharge unit 13 is in contact with the droplet located on the three-dimensional object 16. This brief contact prior to triggering of the next droplet by the discharge unit on the three-dimensional object 16 leads to additional geometric stabilization and thus to even application. After this contact, the object carrier 14 and/or the discharge unit 13 can be displaced relative to one another in the direction of the horizontal arrow, before the next droplet is triggered according to FIG. 2f, before which the relative spacing s is increased again by, in the exemplary embodiment, a vertical movement of the object carrier.

The alternating movement of the object carrier 14 or three-dimensional object 16, on the one hand, and the discharge unit 13, on the other hand, with accompanying variation of the relative spacing s between said elements in a substantially vertical direction, thus in or opposite to the direction of gravity, distinctly increases the quality of the object 16 to be produced. On the one hand, the droplet 15 is cleanly detached and, on the other hand, the applied droplet 15 is clearly solidified on the object.

It goes without saying that the present description may be subjected to the most varied variations, changes and adaptations which are of the nature of equivalents to the appended claims.

The invention claimed is:

1. A method for producing a three-dimensional object from a solidifiable material, which is either in fluid form from the outset or can be liquefied, by sequential discharge of discontinuous droplets, comprising the steps providing the solidiflable material in the fluid phase or plasticising the solidifiable material into the fluid phase, introducing said fluid phase into a material storage means with at least one discharge unit, discharging the discontinuous droplets from an outlet opening by means of the at least one discharge unit towards an object carrier for the three-dimensional object to be produced, wherein the object carrier and the outlet opening or the three-dimensional object and the outlet opening are movable in space at a relative spacing relative to one another in order to influence droplet shape, and varying the relative spacing alternately in opposite directions on discharge of the discontinuous droplets from the at least one discharge unit and on application of the discontinuous droplets on the three-dimensional object during production of the three-dimensional object, wherein a droplet is applied by the at least one discharge unit onto the object carrier or the three-dimensional object in such a manner that the droplet is connected both to the outlet opening and to the object carrier or to the outlet opening and to the three-dimensional object, and in that, after impingement of the droplet on the object carrier or the three-dimensional object, increasing the relative spacing assists detachment of the droplet from the discharge unit.

2. A method according to claim 1, wherein, after impingement of a droplet, the object carrier or the three-dimensional object is moved contrary to a direction of gravity.

3. A method according to claim 2, wherein, after the movement contrary to the direction of gravity, the relative spacing is reduced such that the at least one discharge unit is in contact with the droplet located on the three-dimensional object.

4. A method according to claim 1, wherein a plasticising unit is coupled to the material storage means, that can be pressurized, for introducing the fluid phase into the material storage means and for generating a pressure on the fluid phase in the material storage means wherein the pressure generates the discontinuous droplets in a directly coupled manner.

* * * * *